United States Patent [19]

Frampton

[11] Patent Number: 5,701,955
[45] Date of Patent: Dec. 30, 1997

[54] DOWNHOLE FLUID CONTROL PROCESSES

[75] Inventor: Harry Frampton, West Yorkshire, United Kingdom

[73] Assignee: Allied Colloids Limited, West Yorkshire, United Kingdom

[21] Appl. No.: 566,092

[22] Filed: Dec. 1, 1995

[30] Foreign Application Priority Data

Dec. 2, 1994 [GB] United Kingdom .................. 9424402

[51] Int. Cl.$^6$ ............................................. E21B 33/138
[52] U.S. Cl. ........................................................ 166/295
[58] Field of Search ................................. 166/273, 274, 166/281, 282, 283, 294, 295

[56] References Cited

U.S. PATENT DOCUMENTS

| | | | |
|---|---|---|---|
| 3,302,717 | 2/1967 | West et al. | 166/33 |
| 3,336,979 | 8/1967 | Ingraham et al. | 166/33 |
| 3,353,601 | 11/1967 | Dollarhide et al. | 166/33 |
| 4,172,066 | 10/1979 | Zweigle et al. | 260/29.6 TA |
| 4,182,417 | 1/1980 | McDonald et al. | 166/295 |
| 4,282,928 | 8/1981 | McDonald et al. | 166/274 |
| 4,328,864 | 5/1982 | Friedman | 166/274 |
| 4,572,295 | 2/1986 | Walley | 166/295 |
| 5,260,002 | 11/1993 | Wang | 435/177 X |
| 5,462,866 | 10/1995 | Wang | 435/174 |
| 5,465,792 | 11/1995 | Dawson et al. | |

*Primary Examiner*—William P. Neuder
*Attorney, Agent, or Firm*—Sughrue, Mion, Zinn, Macpeak & Seas, PLLC

[57] ABSTRACT

The invention provides a downhole process for the reduction of the permeability to water of a microporous subterranean formation which has average permeability of not greater than 10 Darcy, the process comprising applying to the formation a dispersion in non-aqueous liquid of water swellable, reverse-phase polymerized, substantially spherical particles of absorbent polymer of which at least 90% by weight have a diameter less than 10 μm whereby the dispersion of the substantially spherical particles of which at least 90% by weight have a size below 10 μm is injected into the micropores of the subterranean formation and the particles are allowed to swell on contact with water and cause the reduction in permeability.

37 Claims, No Drawings

DOWNHOLE FLUID CONTROL PROCESSES

BACKGROUND OF THE INVENTION

This invention relates to downhole processes which involve control of the flow of fluid through a microporous subterranean formation, generally during the recovery of hydrocarbon from a reservoir in that formation or in a formation that interconnects with it.

A typical microporous rock is sandstone, from which most North Sea oil fields are predominantly formed. Some oil fields elsewhere are formed of lime stone or dolomite. These latter two have a very fine microporous structure interspersed with large pores in the form of fractures and rugs.

Because a rock microporous structure has a range of micropore sizes, and because each pore may have variable diameter, it is generally preferred to define the structure in terms of permeability, in Darcys, rather than as pore size, in microns, of the average diameter or the entry diameter. There is an approximate relationship between permeability and diameter (either entry or average diameter). For instance permeability of 1 Darcy may be equivalent to about 10 to 15 µm and 10 Darcy may be equivalent to around 30 to 40 µm.

It is well known that the production of water from a reservoir is undesirable during the recovery of hydrocarbon such as oil or gas. This problem may arise for instance during primary recovery procedures or during water or other fluid flooding. There is often a need to shut-off part or all of a formation when water would otherwise flow through it, while allowing oil to flow through other parts of the formation, during production and/or water flooding. For instance it may be necessary to shut-off fractures or parts of a microporous formation entirely. It is also required in some cases to reduce the permeability of a microporous formation or of certain regions of a microporous formation.

In U.S. Pat. No. 4,328,864 superabsorbent polymers which swell on contact with water are used downhole. A suspension of the unswollen polymer, in a highly saline solution or in a non-aqueous liquid such as isopropanol, for instance thickened by hydroxypropyl cellulose, is injected into the selected subterranean formation. On contact with low-salinity, water-rich, regions of the formation, the polymer swells rapidly and blocks the pores. This does not happen in oil rich portions, so these are not plugged.

A single example is given. The simulated formation is a sand-packed glass tube, having a permeability of 73.8 Darcys. This corresponds with a very large average pore diameter and is characteristic of the packing in hydraulic fracturing of rock and not of microporous rock.

The superabsorbent material used is SGP 502S from Henkel. The particle size is not stated but, since it is described as being supplied initially as powder, it can be assumed that it will include a significant proportion of particles greater than 200 µm in size, and probably a significant proportion above 500 µm. Such a polymer would therefore block fractures internally but would block micropores only as a result of accumulating by filtration at the exposed ends of the micropores, and this will not give effective impermeability to the micropores.

In U.S. Pat. No. 4,572,295 a particulate superabsorbent polymer having defined particle characteristics is used to block selected regions of a subterranean formation. The particles are preferably introduced as a dispersion in a non-aqueous carrier. Various carrier fluids are suggested, including gasoline, diesel fuel, toluene and methanol. It is proposed that it can be desirable to thicken the carrier.

It is specified that the particles of superabsorbent polymer are preferably non-spheroidal, in particular cuboidal or acicular. It is stated that non-spheroidal particles are more readily trapped in the formation. However all the particle sizes that are quoted are again very large and so again will block fractures but will not give effective impermeability to the micropores. The smallest particle size that is quoted is 100 µm (Example 3) and other examples (for instance Examples 4 and 6) show particles having a size of 800 µm or more. It is stated that a substantial fraction of the particles have a size of greater than ¼ but less than 1 times the average pore diameter. It is stated to be preferred to include also particles having diameter 1 to 2 orders of magnitude greater than the average pore diameter. This, together with the disclosures that thickener may be added, indicates that the application is directed to blockage of very high permeability regions such as fractures.

A shut-off process has been commercialised under the trademark Hydroseal II, and the literature relating to this process refers to U.S. Pat. No. 4,572,295 and emphasises that the process is intended for the treatment of microfractures and uses a non-linear particle size distribution. The literature specifically warns against the use of "delayed cross-linked polymers, invert emulsions and plug forming chemicals".

None of these described treatments has gained widespread acceptance or field use. This is most probably due to lack of penetration of the superabsorbent particles into the microporous structure of the formation. This lack of penetration may be acceptable where the water shut-off problem is amenable to treatment very near the well bore or the margins of a fracture, but not in other zones.

U.S. Pat. No. 4,172,066 describes the possibility of using microgels of cross-linked polymer such as polyacrylamide for various uses, which include as thickening agents and for permeability reduction of porous structures. It is disclosed that the polymers may be prepared by reverse phase emulsion polymerisation. If required dry, the polymer particles are generally separated by flocculating and filtering and then washed and dried. It is indicated that they may be employed as prepared. However, in practice, for a permeability reduction application the emulsion product is activated by dilution with deionised water. Dilution is carried out to 0.02% solids. In the presence of the resulting very high proportion of water the polymer particles will be in a fully swollen state. They are then injected into the microporous medium in this swollen state. Thus they are in fact no longer swellable on injection and have no further capacity for absorbing water within the formation. It is also suggested that the polymer particles can be applied in the form of a water in oil emulsion. The clear indication of the disclosure is that the activated, water-diluted emulsion is re-emulsified into oil and then applied to the formation. Application of various materials in this manner is generally known within the oil recovery industry.

U.S. Pat. No. 4,182,417 and U.S. Pat. No. 4,282,928 also discuss systems of this type. Again water in oil emulsions are suggested as application media and in practice the polymer particles are always activated in deionised water before application. Thus they are always applied in the fully swollen form.

It is also known, from for instance U.S. Pat. No. 3,336,979 and U.S. Pat. No. 3,353,601, to reduce permeability of microporous formations using hard particulate material such as glass, limestone, coal, etc. coated with water swellable polymer. The particles may be applied as a slurry in oil.

U.S. Pat. No. 3,302,717 describes the possibility of using cross-linked absorbent polymers for permeability reduction. The laboratory test used to demonstrate this uses a tube filled with a dry mixture of sand and powdered polymer.

It is also known to achieve shut-off in microporous rock by various downhole chemical and/or surface modifying treatments but these all incur various disadvantages.

It would be desirable to be able to provide a process for the reduction of permeability of microporous formations which achieves excellent penetration into the formation and stable permeability reduction in regions which most require it.

SUMMARY OF THE INVENTION

According to the invention there is provided a downhole process in which the permeability to water is reduced of a microporous subterranean formation which has average permeability of not greater than 10 Darcy, the process comprising applying to the formation a dispersion in non-aqueous liquid of water swellable, reverse phase polymerised, substantially spherical particles of absorbent polymer of which at least about 90% by weight have a diameter less than about 10 µm whereby the dispersion of the substantially spherical particles of which at least about 90% by weight have a size below about 10 µm is injected into the micropores of the subterranean formation and the particles are allowed to swell on contact with water and cause the reduction in permeability.

There is also provided a stable dispersion in a non-aqueous liquid of reverse phase polymerised absorbent polymer particles of which at least about 90% by weight have a size below about 10 µm and in which the concentration of polymer is not greater than about 5% by weight of the dispersion. Preferably the concentration is not greater than 1% by weight of the dispersion. Preferably the concentration is above about 0.01%, generally above 0.05%. It is usually from about 0.05 to about 0.5%, for instance 0.05 to 0.25%, especially around 0.1% by weight of the dispersion.

DESCRIPTION OF THE PREFERRED EMBODIMENT

It appears that the use of the spherical particles of size below about 10 µm is advantageous and leads to improved penetration of the treatment dispersion into microporous rock and control of porosity of the structure. This is in contrast to previous published experience. The small particles used in the invention give improved penetration over the prior art. We believe that these very small particles can block pores by water absorption and swelling at constrictions within pores and/or by bridging within pores. Blockage is achieved especially when the absorbent particles swell within the pores.

We also believe that the application of a dispersion of swellable polymer in non-aqueous liquid is advantageous. Use of non-aqueous carrier results in inhibition of swelling by the particles as they are applied and enter the formation. They swell only on contact with water within the formation. On contact with oil rich areas they do not swell. Permeability reduction can therefore be selective, with greater reduction being achieved in water-rich areas than in oil-rich areas.

Reverse phase polymerisation involves emulsification of aqueous water soluble monomer or monomer blend into a first non-aqueous liquid and subsequent polymerisation. It results in the formation of particles which are substantially spherical in contrast to the angularly shaped particles obtained by other production techniques such as comminution of gel particles. The amount of water is usually not more than 70%, preferably 30-60%, by weight based on the polymer. The particles are therefore substantially unswollen and so are swellable and will swell significantly when exposed to excess water. However the resulting dispersion is preferably dehydrated (usually by distillation) subsequent to the polymerisation process to give a substantially anhydrous dispersion (for instance containing less than 20%, and usually less than 10%, by weight water based on the dry weight of polymer).

The absorbent polymer is preferably applied as a very dilute dispersion in non-aqueous liquid, since this promotes penetration. It is important in the invention that the absorbent polymer is in dispersion in a non-aqueous liquid, rather than in an aqueous liquid (i.e., in the activated form). The particles should be swellable on application. If they are applied in activated form in a substantially aqueous carrier they are in swollen form and are thus not swellable in the microporous formation.

Production of this dispersion generally involves mixing the dispersion produced by the reverse phase polymerisation (and if desired dehydration) with a second non-aqueous liquid. The second non-aqueous liquid generally forms the major part of the non-aqueous liquid carrier of the dispersion which is applied to the formation and may be the same as or different from the first non-aqueous liquid used as a medium for the polymerisation.

In general this mixing will involve dilution of the product of the reverse phase polymerisation. Usually addition of the second non-aqueous liquid results in a considerable reduction in the concentration of polymer present in the dispersion.

Alternatively, instead of simply adding the reverse phase dispersion to a second non-aqueous liquid, a solvent exchange system may be employed. In this process the reverse phase emulsion is dehydrated by azeotropic or other distillation and before, during or after this dehydration a second non-aqueous liquid which is less volatile than the first non-aqueous liquid is added to the emulsion and the non-aqueous liquid is distilled from the emulsion until the amount of the first non-aqueous liquid remaining in the dispersion is from about 0 to about 20% by weight of the liquid phase, preferably from about 0 to about 10%. This system is particularly useful when the first and second non-aqueous liquids are different and it is desired that the non-aqueous carrier liquid be made up substantially of the second liquid.

The concentration of absorbent polymer in the dispersion which is finally produced and applied to the subterranean formation is generally from about 0.01 to about 5%, preferably from about 0.05 to about 1%, more preferably from about 0.05 to about 0.5%, for instance about 0.05 to about 0.25%, especially around 0.1% by weight of the dispersion. It is believed that this very low concentration of absorbent polymer assists in ensuring that the dispersion is injected fully into the micropores of the subterranean formation. It is believed that the mechanism of bridging filtration, in which particles having diameters smaller than the pore size aggregate within and bridge across the micropore, generally near its inlet, thus preventing further progress of the dispersion into the microstructure, occurs to a greater extent when the concentration of polymer is higher. Therefore one of the advantages of using a low concentration of polymer in the applied dispersion is reduction in bridging filtration and consequent increase in penetration of the dispersion into the microstructure.

The low concentration should be achieved while avoiding unwanted coagulation of the absorbent polymer particles before they enter the micropores, and the second non aqueous liquid should be chosen appropriately. Coagulation leads to increased effective particle size and subsequent lower penetration into the micropores. However, some coagulation can be tolerated provided the resultant particle size is still sufficiently small to allow adequate penetration.

Appropriate choice of a suitable non-aqueous carrier liquid for the applied dispersion can assist in ensuring that the dispersion of the substantially spherical particles which is injected into the micropores has at least about 90% by weight below about 10 microns. The liquid preferably has a very low level of coagulating agents or other impurities or components that would destabilise and coagulate the dispersion. Conventional diesel fuel as specified in U.S. Pat. No. 4,572,295 and other prior art references discussed above often is not suitable, even when filtered. It often contains too high a level of impurities which induce coagulation. Filtered "base diesel" i.e. diesel with a much lower level of additives, has on the other hand been found by us to be suitable. Other non-aqueous liquids containing a low level of coagulation inducing additives may be used, in particular when filtered.

In general the reverse phase polymerisation does not have to be carried out in filtered based diesel or other suitable non-coagulation inducing liquid, but is conducted in a conventional carrier for reverse phase polymerisation. Generally the dispersion produced by the reverse phase polymerisation (and optionally dehydration) is diluted with filtered base diesel. Dilution with non-aqueous liquid is generally at least 10 times, preferably 50 times and may be up to 1,000 or 5,000 times. Therefore usually at least 90%, preferably 98%, more preferably 99.9% or more of the non-aqueous liquid in the applied dispersion is a liquid which is added to the preformed dispersion and which does not cause coagulation of the absorbent polymer particles.

Materials in addition to the absorbent polymer maybe contained in the dispersion in non-aqueous liquid. However, the solid phase in the dispersion generally consists essentially only of the particles of absorbent polymer.

The absorbent polymer is made by reverse-phase polymerisation of water soluble monomer or monomer blend, and the or each monomer is ethylenically unsaturated.

The or each monomer may be non-ionic, cationic or anionic. Preferably the polymer is cationic or anionic, often having 10 to 80, often 10 to 50, mole % non-ionic monomer.

Suitable anionic monomers include carboxylic and sulphonic acid monomers. Preferred are carboxylic (meth) acrylic monomers, in particular (meth) acrylic acid, usually present as sodium, ammonium or other water soluble salt. Preferred sulphonic acid monomers include 2-acrylamido-2-methyl propane sulphonic acid (AMPS) and allyl sulphonate.

Cationic monomers may be selected from acid addition or quaternary salts of dialkylaminoalkyl (meth)-acrylates and -acrylamides, in which the alkyl groups are, independently, preferably C1-4 alkyl groups, in particular ethyl and methyl groups. Suitable monomers include methyl chloride quaternised dimethylaminoethyl acrylate and methyl chloride quaternised dimethylaminomethyl methacrylate. Other suitable cationic monomers include diallyl dialkyl ammonium salts, for instance diallyl dimethyl ammonium chloride.

Suitable non-ionic monomers include (meth) acrylamide.

The absorbent polymer may be soluble in water. Alternatively it may be insoluble but swellable. Insolubility may be provided by using insoluble monomers but preferably it is provided as a result of cross-linking the polymer particles.

Cross-linking is achieved preferably with the use of a polyethylenically unsaturated compound as cross-linker, for instance MBA (methylene bis acrylamide). Alternatively cross-linking may be achieved through pendant groups in the polymer itself giving for instance epoxy or formaldehyde linkages or by use of a polyvalent metal.

Cross-linking may be sufficient to give substantially no or only a low amount of soluble polymer. The polymer will then be insoluble but swellable and may have properties typical of a superabsorbent. The polymer preferably has a gel capacity of at least 20 g deionised water per gram polymer, more preferably at least 50 g. Typically the amount of cross-linking agent used is greater than 100 ppm, preferably greater than 200 ppm and may be up to 500 or 1,000 ppm of polyethylenically unsaturated cross-linker for instance MBA. Typically the amount of cross-linking agent may be around 250 to 500 ppm.

Preferably the absorbent polymer is less cross-linked. More preferably it is cross-linked to a degree that the particles are insoluble but comprise a substantial fraction of soluble polymer. Suitable polymers are exemplified in our European Patent No. 202,780. Preferably the soluble fraction should be such that when utilising 1 g of total polymer (soluble and insoluble) the polymer appears to have an intrinsic viscosity greater than 3 or 4, preferably above 6 dl/g (measured by suspended level viscometer at 25° C. in 1N NaCl buffered to pH 7). Intrinsic viscosity may be up to 15 or 20 dl/g but is preferably less than 10 dl/g. Preferably the polymer has a specific viscosity (as defined in EP 202,780) of at least 100.

Preferably this soluble absorbent polymer has ionic regain (as defined in EP 202,780) of above 20%, preferably above 30%. Ionic regain may be up to 60% or 75% and is preferably 20 to 50%, more preferably 25 to 50%.

Preferably this soluble absorbent polymer is cationic. More preferably it is formed of dimethylaminoethyl (meth) acrylate quaternised with methyl chloride, optionally together with monomer of (meth) acrylamide.

In general, heavier cross-linking of the absorbent polymer, of whichever type, results in a smaller swollen volume per particle. This means that the greatest permeability at which the polymer can act effectively will generally be lower for heavily cross-linked than for lightly cross-linked polymers. However, this must be balanced against the fact that highly cross-linked particles show greater resistance to movement caused by a given pressure drop. Therefore in regions where there is a high pressure drop it may be desirable to choose heavily cross-linked particles over more lightly cross-linked particles.

In general however the less cross-linked polymer which comprises a substantial fraction of soluble polymer is more effective in the process of the invention than those which have the characteristics typical of a conventional superabsorbent because the more lightly cross-linked polymers are capable of swelling to a larger size in the same aqueous medium, while the walls of the micropores prevent the soft, swollen, polymer being forced out of the micropores.

It is also believed that cationic polymers are advantageous in that they are less sensitive to the presence of salts than anionic polymers, in particular acrylic acid-based anionic absorbent polymers.

It may in certain cases be desirable to ensure that the rate of swelling of the particles on contact with water is high. This is because swelling must be sufficiently rapid that the polymer particles increase in size to such an extent that they lodge in the rock pore throats and are not dislodged when oil or gas production continues. For instance, when the dispersion is applied the absorbent polymer particle will be situated within the pores of the reservoir rock and surrounded by non-aqueous liquid. As they are injected they may encounter water trapped in rock pores, but only for a short time. When production is resumed swelling with water contact should be rapid so that the polymer is not flushed back out of the rock before it can block the micropores. This is particularly important in the region near the well bore, where pressures and shear rates are particularly high. This is also important where the treatment dispersion is required to be effective in watered-out zones.

It is essential that at least 90% by weight of the absorbent polymer particles have a diameter less than 10 microns. Preferably at least 90% of the particles have a diameter of not more than 6 µm, often not more than 3 µm. The diameter can be as low as 0.1 µm but is preferably greater than 0.5 µm. The optimum particle size for any particular formation can be found by experiment. Often formations of permeability below 3 Darcy are best treated with dispersions of particles of which 90% by weight have diameter below 6 µm, and often below 3 µm.

The particles of which at least 90% have a diameter of below 10 µm are visible by appropriate microscopic examination, such as scanning electron microscopy on a dried film of the dispersion on an SEM stub. The particle size is the size of the particles in such a dried film.

The dispersion may contain other additives provided they do not lead to unwanted coagulation. These may include additives which aid absorption and swelling on contact with saline water. Such additives include sodium carbonate, surfactants and mixtures thereof.

The subterranean formation which is treated has a permeability of not greater than 10 Darcy. Such formations include sandstone, which typically has a microstructure in which the average pore size can be around 35 microns, corresponding with permeability of around 5 Darcy. Individual pores have variable sizes and shapes. The rock may also comprise fractures which are very much bigger (having for instance a pore size of 60 microns or more). The average permeability of the formation is preferably not greater than 5 Darcy and may be as low as or below 2 Darcy.

The formation may also be a limestone formation. Limestone formations will generally require use of very small particle size and/or soluble or lightly cross-linked absorbent polymer since they have a very fine microporous structure despite having a coarse macroporous structure due to the presence of very large fractures and vugs. If the polymer is soluble or sufficiently lightly cross-linked the polymer particles will adopt the dimensions of the micropores even if the particle size is greater than the pore diameter.

In the process the dispersion is injected into the formation. This may involve simply introducing the dispersion into a well bore and allowing it to seep into the micropores of the rock formation. Preferably however the dispersion is applied under pressure to the formation and forced into the micropores. The conditions of injection (e.g. the temperature and deliberate or unintentional contamination of the dispersion) should be such that the dispersion has more than 90% particles of size below 10 µm when it is contacting and entering the formation, that is, we aim to avoid significant coagulation to above 10 µm.

The process of the invention may be used in various ways. If water is found to be produced from a formation, indicating the presence of "streaking", the high permeability area may be treated at the injection well by applying selectively to it the dispersion, followed by applying water (if the water in the streak, or travelling through the streak during oil production is not sufficient by itself) to cause the particles to swell and block the streak.

Alternatively the dispersion may be injected into the entire formation, in particular near to a production well, before any water production problems are observed. When hydrocarbon such as oil or gas is passing through the formation the particles of absorbent polymer remain unswollen and do not block the pores. If however water begins to pass through any region of the formation, the particles are caused to swell and block that region.

It may also be useful to use the process in a formation which contains some oil rich and some water rich regions. Injection of the dispersion indiscriminately into the formation results in swelling of the absorbent particles and blockage of the pores in water rich regions and no blockage in oil rich regions.

It is generally known that the swollen volume of absorbent particles tends to decrease with increasing temperature. Therefore it might be expected that there would be an upper limit on the temperature at which the dispersions of the invention are effective. Surprisingly, the applicant has found that absorbent polymers can be used in the invention at high temperatures, for instance greater than 60° C., even as high as 90° C. This is desirable due to the often high temperatures within oil and gas rich formations.

EXAMPLES OF THE INVENTION

The following examples illustrate the invention. In the examples the following abbreviations are used:

ACM=acrylamide

DMAEA=dimethyl amino ethyl acrylate quaternised with MeCl

DMAEMA=dimethyl amino ethyl meth acrylate quaternised with MeCl

AA=acrylic acid as partial ammonium salt

MBA=methylene bis acrylamide

Parts per million (ppm) of MBA are given by weight of aqueous phase.

Example 1

BP Base diesel was filtered through a 1.2 µm Millipore filter. Samples of four different polymers were made up. The polymers were supplied in the form of a liquid dispersion of polymer in oil. The liquid dispersion was added by vortex addition to the filtered base diesel to give a level of 1,000 ppm polymer and stirred for two hours using a Heidolph stirrer. Filterability tests were carried out through 5 µm Millipore™ filters at 30 psi. Results are shown in Table 1 below.

TABLE 1

| Polymer | | Volume Filtered in 30 mins (cm³) |
|---|---|---|
| A | cationic, lightly cross-linked (2 ppm MBA) of 58 wt % ACM, 42 wt % DMAEA | 500 cm³ in 27 seconds |
| B | cationic, lightly cross-linked (20 | 199 cm³ |

TABLE 1-continued

| Polymer | | Volume Filtered in 30 mins (cm³) |
|---|---|---|
| C | ppm MBA) of 20 wt % ACM, 80 wt % DMAEA cationic, heavily cross-linked (700 ppm MBA) of 100% DMAEMA | 404 cm³ |
| D | anionic, heavily cross-linked (250–590 ppm MBA) of 20 wt % ACM, 75% AA | 500 cm³ in 30 seconds |

The fast filtration rates of A and D show that these are the more injectable compositions.

Example 2

Polymers A and D as 0.1% dispersions in filtered base diesel were tested in API seawater and API freshwater. Polymer suspensions were made up as in Example 1. Filterability tests were carried out through 5 μm Millipore™ filters at 10 psi. Results are shown below in Table 2.

TABLE 2

| | Volume Filtered in 30 mins (cm³) | |
|---|---|---|
| Polymer | API Freshwater | API Seawater |
| A | 17 | 16 |
| D | 9.5 | 20.5 |

Both Products A and D blocked the filters when applied in either API freshwater or API seawater. This illustrates the ability of the dispersions of absorbent polymer particles to dramatically reduce permeability of microporous structures. The results also show that the performance of the anionic (D) is dependent on salinity, so cationic polymers such as A are generally preferred.

Example 3

Suspensions of Polymer A were made up in API seawater as in Example 1 with the difference that the length of time for which the mixture was stirred was varied from 10 mins to 3 hours. Filterability tests were then carried out through 5 μm Millipore™ filters at 20 psi. Results are shown below in Table 3.

TABLE 3

| Mixing Time (mins) | Volume (mls) in 30 mins |
|---|---|
| 10 | 18 |
| 20 | 27 |
| 30 | 11 |
| 65 | 11 |
| 120 | 19 |
| 180 | 12 |

Mixing time was not found to affect significantly the blocking of the filters. This illustrates the rapid swelling shown by Polymer A particles when in contact with brine.

Example 4

Suspensions of Polymer A were made up in API seawater as in Example 1. Whilst the mixture was being stirred for 2 hours the container was suspended in a water bath at a set temperature.

Filterability tests were carried out as in Example 1. Results are shown below in Table 4.

TABLE 4

| Temperature (°C.) | Volume (mls) filtered in 30 mins |
|---|---|
| 22 | 16/19 |
| 40 | 22.5 |
| 70 | 39.5 |
| 90 | 14 |

The temperature tests show an unexpectedly low sensitivity of the pore blocking effect to high temperatures.

The above results show that the dispersions of Polymers A to D, in particular those of Polymers A and D, inject easily into filters simulating a microporous rock formation when dispersed in filtered BP Base diesel. This shows the excellent penetrating ability of the dispersions used in the process of the invention.

Example 5

Suspensions of Polymer A were made up to give levels of 1,000 ppm, 5,000 ppm, 10,000 ppm and 30,000 ppm polymer in the same way as in Example 1 in filtered base diesel. Filterability tests were carried out through 5 μm Millipore™ at 10 psi. The same was done with Polymer B.

For Polymer A, a volume of 500 cm³ of the 1,000 ppm dispersion was filtered in less than 1 second. A volume of 500 cm³ of the 5,000 ppm dispersion was collected in 4 seconds. A volume of 500 cm³ of the 30,000 ppm dispersion was collected in 8 seconds.

500 cm³ of the 1,000 ppm dispersion of Polymer B in base diesel was filtered in less than 1 second. After 30 minutes 230 cm³ of the 5,000 ppm dispersion, 180 cm³ of the 10,000 ppm dispersion and 60 cm³ of the 30,000 ppm dispersion had been collected.

These experiments show the increased filterability and therefore penetrating ability of dispersions with decreasing concentration.

I claim:

1. A downhole process for the reduction of the permeability to water of a microporous subterranean formation which has average permeability of not greater than 10 Darcy, the process comprising applying to the formation a dispersion in non-aqueous liquid of water swellable, reverse-phase polymerised, substantially spherical particles of absorbent polymer of which at least 90% by weight have a diameter less than 10 μm whereby the dispersion of the substantially spherical particles of which at least 90% by weight have a size below 10 μm is injected into the micropores of the subterranean formation and the particles are allowed to swell on contact with water and cause the reduction in permeability.

2. A process according to claim 1, in which the dispersion has a water content of not more than 70% by weight of polymer.

3. A process according to claim 1 in which the dispersion has a water content of not more than 20% by weight of polymer.

4. A process according to claim 1 in which the concentration of absorbent polymer in the dispersion is from 0.01 to 5% by weight of the dispersion.

5. A process according to claim 1 in which the concentration of absorbent polymer in the dispersion is from 0.05 to 1% by weight of the dispersion.

6. A process according to claim 1 in which the non-aqueous liquid consists substantially only of filtered base diesel.

7. A process according to claim 1, in which the dispersion has been produced by a process comprising reverse phase polymerisation of water soluble monomer or monomer blend in aqueous solution emulsified into a first non-aqueous liquid and optional dehydration and mixing the product of the reverse phase polymerisation and optionally dehydration with a second non-aqueous liquid, wherein the first and second non-aqueous liquids may be the same or different and the second does not cause coagulation to a size of above 10 μm of the absorbent polymer particles.

8. A process according to claim 1 in which the absorbent polymer is a polymer produced from water soluble ethylenically unsaturated monomer or monomer blend the monomers being selected from cationic monomers and blends of cationic monomer with non-ionic monomer.

9. A process according to claim 1 in which the absorbent polymer is a cationic, water swellable, water insoluble polymer.

10. A process according to claim 1 in which the absorbent polymer is a cationic polymer having ionic regain of 20 to 60%.

11. A process according to claim 10 in which the absorbent polymer has an intrinsic viscosity of above 4, preferably above 6, dl/g.

12. A process according to claim 1 in which the absorbent polymer has a gel capacity of at least 20 g deionised water per gramme polymer.

13. A process according to claim 1 in which at least 90% of the particles have a diameter from 0.5 to 5.5 μm.

14. A process according to claim 1 in which the subterranean formation has an average permeability of not greater than 5 Darcy.

15. A stable dispersion in a non-aqueous liquid of reverse phase polymerised, substantially spherical, absorbent polymer particles of which at least 90% by weight have a size below 10 μm and in which the concentration of polymer is not greater than 5% by weight of the dispersion.

16. A dispersion according to claim 15 in which the concentration of polymer is not greater than 1% by weight of the dispersion.

17. A dispersion according to claim 15 in which the concentration of polymer is from 0.05 to 1% by weight of the dispersion.

18. A dispersion according to claim 15 which has a water content of not more than 70% by weight of polymer.

19. A dispersion according to claim 15 which has a water content of not more than 20% by weight of polymer.

20. A dispersion according to claim 15 in which the non-aqueous liquid consists substantially only of filtered base diesel.

21. A downhole process for the reduction of the permeability to water of a microporous subterranean formation which has average permeability of not greater than 10 Darcy, the process comprising
applying to the formation a dispersion in non-aqueous liquid of water swellable, reverse-phase polymerized, substantially spherical particles of absorbent polymer of which at least 90% by weight have a diameter less than 10 μm, wherein the dispersion has a water content of not more than 20% by weight of polymer
whereby the dispersion of the substantially spherical particles of which at least 90% by weight have a size below 10 μm is injected into the micropores of the subterranean formation and the particles are allowed to swell on contact with water and cause the reduction in permeability.

22. A process according to claim 21, in which the dispersion has a water content of not more than 10% by weight of polymer.

23. A process according to claim 21, in which at least 90% of the polymer particles have a diameter of not more than 3 μm.

24. A downhole process for the reduction of the permeability to water of a microporous subterranean formation which has average permeability of not greater than 10 Darcy, the process comprising
applying to the formation a dispersion in non-aqueous liquid of water swellable, reverse-phase polymerized, substantially spherical particles of absorbent polymer of which at least 90% by weight have a diameter less than 10 μm,
wherein the dispersion has been produced by a process comprising reverse phase polymerization of water-soluble monomer or monomer blend in aqueous solution emulsified into a first non-aqueous liquid and dehydration of the emulsion
whereby the dispersion of the substantially spherical particles of which at least 90% by weight have a size below 10 μm is injected into the micropores of the subterranean formation and the particles are allowed to swell on contact with water and cause the reduction in permeability.

25. A process according to claim 24, in which the dispersion has been produced by a process comprising reverse phase polymerization of water-soluble monomer or monomer blend in aqueous solution emulsified into a first non-aqueous liquid to produce a reverse phase emulsion and dehydrating the reverse phase emulsion by distillation and adding to the emulsion, before, during or after the dehydration a second non-aqueous liquid which is less volatile than the first non-aqueous liquid and distilling the non-aqueous liquid from the emulsion until the amount of the first non-aqueous liquid remaining in the dispersion is from about 0 to about 20% by weight of the liquid phase.

26. A downhole process for the reduction of the permeability to water of a microporous subterranean formation which has average permeability of not greater than 10 Darcy, the process comprising
applying to the formation a dispersion in non-aqueous liquid of water swellable, reverse-phase polymerized, substantially spherical particles of absorbent polymer of which at least 90% by weight have a diameter less than 10 μm,
in which the polymer particles comprise a substantial fraction of soluble polymer such that the polymer gives an intrinsic viscosity value greater than 3,
whereby the dispersion of the substantially spherical particles of which at least 90% by weight have a size below 10 μm is injected into the micropores of the subterranean formation and the particles are allowed to swell on contact with water and cause the reduction in permeability.

27. A process according to claim 26 in which the polymer gives an intrinsic viscosity value greater than 6 dl/g.

28. A process according to claim 26 in which the absorbent polymer is a polymer produced from water-soluble ethylenically unsaturated monomer blend, the monomers being selected from cationic monomers and blends of cationic monomer with non-ionic monomer.

29. A process according to claim 28 in which the polymer has ionic regain of from 20 to 60%.

30. A downhole process for the reduction of the permeability to water of a microporous subterranean formation which has average permeability of not greater than 10 Darcy, the process comprising applying to the formation a dispersion in non-aqueous liquid of water-swellable, reverse-phase polymerized, substantially spherical particles of absorbent polymer of which at least 90% by weight have a diameter less than 10 µm, in which the non-aqueous liquid consists substantially only of filtered base diesel, whereby the dispersion of the substantially spherical particles of which at least 90% by weight have a size below 10 µm is injected into the micropores of the subterranean formation and the particles are allowed to swell on contact with water and cause the reduction in permeability.

31. A process according to claim 30 in which the dispersion has been produced by a process comprising reverse-phase polymerization of water-soluble monomer or monomer blend in aqueous solution emulsified into a first non-aqueous liquid which is not filtered base diesel and optional dehydration and mixing the product of the reverse-phase polymerization and optional dehydration with a second non-aqueous liquid which consists substantially only of filtered base diesel.

32. A process according to claim 31 in which the dispersion has been produced by a process comprising reverse-phase polymerization of water-soluble monomer or monomer blend in aqueous solution emulsified into a first non-aqueous liquid which is not filtered base diesel to form a reverse-phase emulsion and dehydrating the reverse-phase emulsion by distillation and adding to the emulsion before, during or after dehydration a second non-aqueous liquid which consists substantially only of filtered base diesel and distilling the non-aqueous liquid from the emulsion until the amount of the first non-aqueous liquid remaining in the dispersion is from about 0 to above 20% by weight of the liquid phase.

33. A process according to claim 32 in which the amount of the first non-aqueous liquid remaining in the dispersion is from about 0 to about 10% by weight of the liquid phase.

34. A process according to claim 30 in which the dispersion has been produced by a process comprising reverse-phase polymerization of water-soluble monomer or monomer blend in aqueous solution emulsified into a first non-aqueous liquid to form a reverse-phase emulsion and dehydrating the emulsion.

35. A stable dispersion in non-aqueous liquid of reverse-phase polymerized, substantially spherical, absorbent polymer particles of which at least 90% by weight have a size below 10 µm in which the concentration of polymer is not greater than 5% by weight of the dispersion and the dispersion has a water content of not more than 20% by weight of polymer.

36. A dispersion according to claim 35 which has a water content of not more than 10% by weight of polymer.

37. A dispersion according to claim 35 in which at least 90% by weight of the polymer particles have a size below 3 µm.

* * * * *